3,043,877
PROCESS FOR THE 12a-HYDROXYLATION OF 12a-DEOXYTETRACYCLINES
Chester E. Holmlund, Pearl River, and William W. Andres, New City, N.Y., assignors to American Cyanamid Company, New York, N.Y., a corporation of Maine
No Drawing. Filed Oct. 28, 1960, Ser. No. 65,587
3 Claims. (Cl. 260—559)

This invention relates to a novel process for the 12a-hydroxylation of 12a-deoxytetracyclines and, more particularly, is concerned with the 12a-hydroxylation of such 12a-deoxytetracyclines by the use of chemical oxidizing agents.

The 12a-deoxytetracyclines are new members of the tetracycline series and may be prepared both synthetically and from various tetracyclines obtained by fermentation processes. As set forth in U.S. Patent 2,922,817 to Green, the 12a-deoxytetracyclines may be prepared by the chemical reduction of the corresponding tetracyclines with metallic zinc in an aqueous solution of ammonia, and the 12a-deoxytetracyclines may, in turn, be converted to the corresponding 12a-deoxyanhydrotetracyclines by the use of strong mineral acids or common dehydrating agents. Similarly, the preparation of 4-dedimethylamino-12a-deoxy-7-chlorotetracycline by contacting 7-chlorotetracycline with metallic zinc in glacial acetic acid has been described by Stephens et al., J.A.C.S. 76, 3568 (1954).

The total chemical synthesis of 4-dedimethylamino-12a-deoxyanhydrotetracycline-10-monomethyl ether from 3-methoxybenzoic acid has been reported by Muxfeldt, Ber. 92, 3122 (1959). In the publication by Boothe et al., J.A.C.S. 81, 1006 (1959), there is disclosed the total chemical synthesis from 4-chloro-3-methylanisole of 4 - dedimethylamino - 6 - demethyl - 12a - deoxy - 7 - chloroanhydrotetracycline. Similarly, the total synthesis of 4 - dedimethylamino-6-demethyl-6,12a-dideoxy-7-chlorotetracycline from 4-chloro-3-methylanisole is disclosed in the publication by Fields et al., J.A.C.S. 82, 1250 (1960).

The 12a-deoxytetracyclines are valuable intermediates for the preparation of 12a-deoxyanhydrotetracyclines as is more fully set forth in U.S. Patent 2,922,817 to Green. The 12a-deoxyanhydrotetracyclines so-prepared are biologically active and possess activity against a variety of gram-positive and gram-negative microorganisms, and particularly against certain tetracycline-resistant strains of bacteria. The 12a-deoxytetracyclines are also valuable intermediates for the preparation of the corresponding tetracyclines by virtue of the novel 12a-hydroxylation process of the present invention, and the biological activity of the tetracyclines is too well known to require elaboration.

The present invention is not limited to any particular 12a-deoxytetracycline as the starting material but may be applied with equal facility to any 12a-deoxytetracycline whether prepared synthetically or from tetracyclines obtained by fermentation processes. Thus, 12a-deoxytetracycline, 6,12a-dideoxytetracycline, 4-dedimethylamino-12a-deoxytetracycline, 6-demethyl-12a-deoxytetracycline, 6-demethyl-12a-deoxy-7-chlorotetracycline, 4-dedimethylamino - 6 - demethyl - 12a - deoxy - 7 - chlorotetracycline, and 4-dedimethylamino-6-demethyl-6,12a-dideoxytetracycline may all be 12a-hydroxylated with equal facility by the novel process of the present invention.

In accordance with the present invention, we have now discovered that it is possible to 12a-hydroxylate 12a-deoxytetracyclines by means of chemical oxidizing agents to form the corresponding tetracyclines. The conditions for this reaction are fairly critical in the sense that pH, concentration of the oxidizing agent, and temperature influence both the yield of the final product as well as the rate of the reaction. It has been found that 12a-hydroxylation of the 12a-deoxytetracyclines may take place at a pH of between about 2 and 7 and preferably at a pH of about 4.2–4.4 for optimum results. Preferably, the pH is maintained at the desired level by the use of a suitable buffer, i.e., citrate-phosphate buffer although the use of this particular buffer is not at all critical as its sole function is to supply pH control.

The reaction may be carried out at temperatures ranging from about 0° C. to about 50° C., and preferably the reaction is conducted at about room temperature, that is from about 25° C. to about 30° C.

Among the suitable oxidizing agents that may be employed in carrying out the described 12a-hydroxylation are potassium permanganate, potassium dichromate, potassium ferricyanide, sodium nitrite, potassium nitrite, iodine, and potassium persulfate. Sodium hypochlorite and potassium iodate may also be used but are not preferred since the rate of the reaction is much slower and a relatively longer period of time is required for the desired 12a-hydroxylation. The invention is not limited to the oxidizing agents listed above but other oxidizing agents having standard oxidizing potentials at 25° C. within the range of from +0.1 volt to +2.0 volts may also be used if desired. The concentration of the oxidizing agent that is necessary to effect the desired 12a-hydroxylation may be varied over a fairly wide range. In general, it has been found that the oxidizing agent may be present in the reaction mixture in amounts ranging from about one-eighth to about twice the molar concentration of the 12a-deoxytetracycline.

The invention will be described in greater detail in conjunction with the following specific examples.

*Example 1*

To a 4 liter flask are added 800 milliliters of pH 4.4 citrate-phosphate buffer, 100 milliliters of an aqueous solution of sodium nitrite at a concentration of 800 $\mu$g./ml., and 100 milliliters of an acidified solution of 12a-deoxytetracycline (prepared by the procedure of U.S. Patent 2,922,817 to Green) at a concentration of 10 mg./ml. The flask containing the reaction mixture is agitated on a reciprocating shaker for 3 hours. The reaction mixture is then adjusted to a pH of 8.5–8.6 and extracted several times with butanol. The pooled butanol extracts are concentrated to a small volume and the crude tetracycline precipitated by the addition of ten volumes of petroleum ether. The tetracycline is freed of most of its impurities by partition chromatography and subsequent crystallization. The crystalline tetracycline which is obtained is identified by infrared, ultraviolet, and paper chromatographic techniques and by microbiological activity.

*Example 2*

0.5 milliliter of an aqueous solution of 12a-deoxytetracycline at a concentration of 5 mg./ml. (prepared by the procedure of U.S. Patent 2,922,817 to Green) is added to 4 milliliters of citrate-phosphate buffer prepared at pH 4.4. 0.5 milliliter of a solution of potassium permanganate at 460 $\mu$g./ml. is added and the mixture is agitated for 2 hours at a temperature of 28° C. An assay of an aliquot is analyzed for substrate and indicates the substantial absence of 12a-deoxytetracycline. The reaction mixture is assayed against *Staphylococcus aureus* and it is found that the reaction mixture has typical tetracycline antibacterial activity.

*Example 3*

The procedure of Example 2 is repeated except that 0.5 milliliter of a solution of potassium dichromate at 860

μg./ml. is used as the oxidizing agent. The reaction is carried out at 28° C. for 2 hours. Paper strip chromatography indicates the presence of tetracycline.

*Example 4*

The procedure of Example 2 is repeated except that 0.5 milliliter of a solution of potassium ferricyanide at 960 μg./ml. is used as the oxidizing agent. The reaction is carried out at 28° C. for 2 hours. Paper strip chromatography indicates the presence of tetracycline.

*Example 5*

The procedure of Example 2 is repeated except that 0.5 milliliter of a solution of potassium persulfate at 1580 μg./ml. is used as the oxidizing agent. The reaction is carried out at 28° C. for 2 hours. Paper strip chromatography indicates the presence of tetracycline.

*Example 6*

The procedure of Example 2 is repeated except that 0.5 milliliter of a solution of iodine at 480 μg./ml. is used as the oxidizing agent. The reaction is carried out at 28° C. for 2 hours. Paper strip chromatography indicates the presence of tetracycline.

*Example 7*

The procedure of Example 2 is repeated except that 0.5 milliliter of a solution of potassium nitrite at 1000 μg./ml. is used as the oxidizing agent. The reaction is carried out at 28° C. for 2 hours. Paper strip chromatography indicates the presence of tetracycline.

*Example 8*

The procedure of Example 2 is repeated except that an equivalent quantity of potassium iodate is used as the oxidizing agent. The reaction is carried out as in the preceding examples but a longer period of time is required before the reaction mixture indicates the presence of tetracycline.

*Example 9*

The procedure of Example 2 is repeated except that an equivalent quantity of sodium hypochlorite is used as the oxidizing agent. The reaction is carried out as in the preceding examples but a longer period of time is required before the reaction mixture indicates the presence of tetracycline.

*Example 10*

2.5 milliliters of a methanol solution of 4-dedimethylamino-12a-deoxytetracycline at a concentration of 1 mg./ml. (prepared by contacting tetracycline with metallic zinc in glacial acetic acid for 72 hours according to the procedure of Stephens et al.) is added to 1 milliliter of citrate-phosphate buffer prepared at pH 4.4. 1.5 milliliters of an aqueous solution of sodium nitrite at 1300 μg./ml. is added and the mixture is stirred for two hours at 28° C. 12a-hydroxylation of the substrate is indicated by the increased antibacterial activity detected in aliquots of the reaction mixture by the *Micrococcus pyogenes* turbidimetric assay.

| Time hrs. | Turb. assay, μg./ml. as DDMATC [1] |
|---|---|
| 0 | ±10.0 |
| 2 | 108.0 |

[1] 4-dedimethylaminotetracycline.

*Example 11*

6-demethyl-12a-deoxy-7-chlorotetracycline is prepared according to the procedure of U.S. Patent 2,922,817 to Green. After the reaction is complete the excess zinc is filtered off and the filtrate cooled in an ice bath prior to acidifying with concentrated hydrochloric acid. The reaction mixture is diluted with pH 4.4 citrate-phosphate buffer so that a spectrophotometric assay of the solution indicates the presence of approximately 850 gammas per milliliter of the 12a-deoxy product. To a 50 milliliter flask is added 1 milliliter of this pH 4.4 buffered substrate solution and 1 milliliter of a solution containing 52 gammas per milliliter of sodium nitrite. The flasks are then shaken on a reciprocating shaker for 2 hours at 28° C. At this time spectrophotometric assay indicates a drop in the concentration of 6-demethyl-12a-deoxy-7-chlorotetracycline from an initial concentration of 430 μg./ml. to 45 μg./ml., and a microbiological assay indicates an increase in antibacterial activity expressed as 6-demethyl-7-chlorotetracycline from an initial value of 30 μg./ml. to greater than 100 μg./ml.

*Example 12*

The procedure of the preceding example is followed except that the 12a-deoxytetracycline in this instance is 6-demethyl-12a-deoxytetracycline which is prepared by the procedure of U.S. Patent 2,922,817 to Green. Its concentration in citrate-phosphate buffered solution is approximately 1100 μg./ml. The sodium nitrite solution employed is at a concentration of 70 μg./ml. At the end of the two hour reaction period spectrophotometric assay indicates a drop in the concentration of the 6-demethyl-12a-deoxytetracycline from an initial value of 550 μg./ml. to 72 μg./ml., and a microbiological assay indicates an increase in the antibacterial activity expressed as 6-demethyltetracycline from an initial value of 18 μg./ml. to 152 μg./ml.

*Example 13*

The procedure of Example 11 is followed except that the 12a-deoxytetracycline in this instance is 6,12a-dideoxytetracycline which is prepared by the procedure of the aforesaid Green patent. Its concentration in citrate-phosphate buffered solution is about 650 μg./ml. The sodium nitrite solution employed is at a concentration of 70 μg./ml. At the end of the reaction period spectrophotometric assay indicates a drop in the concentration of 6,12a-dideoxytetracycline from an initial value of 320 μg./ml. to 78 μg./ml., and a microbiological assay indicates an increase in the antibacterial activity expressed as 6-deoxytetracycline from an initial value of 28 μg./ml. to 92 μg./ml.

*Example 14*

To a 125 ml. Erlenmeyer flask is added 4.5 ml. of pH 4.4 McIlvaine buffer (for composition see page 1405, 30th edition, Handbook of Chemistry and Physics), 0.5 ml. of a 2% aqueous solution of sodium nitrite and 5 ml. of a methanolic solution of 4-dedimethylamino-6-demethyl-6,12a-dideoxytetracycline (obtained by catalytic reduction of the 7-chloro analog prepared according to the procedure of Fields et al.) at a concentration of 1 mg./ml. In a control flask the sodium nitrite solution is omitted, being replaced by 0.5 ml. of water. The solutions are agitated by placing the flasks on a reciprocating shaker and samples are removed periodically to determine the course of 12a-hydroxylation by spectrophotometric assay. The 0.5 ml. aliquots of the reaction mixture were added to 9.5 ml. of M/10 sodium borate solution. After standing for 30 minutes the absorption at 465 mμ was read. Under these conditions 12a-deoxytetracyclines display an absorption peak at 465 mμ, which is absent for 12a-hydroxylated tetracyclines. The following data were obtained:

| Time, Hrs. | Optical Density at 465 mμ in M/10 Borate | |
|---|---|---|
| | Sample + NaNO$^2$ | Control |
| 0 | 0.609 | 0.925 |
| 1 | 0.392 | 1.18 |
| 5 | 0.355 | 0.958 |

The progressive decline of the 465 mμ peak with time indicates the rate of 12a-hydroxylation.

Example 15

Spores of a strain of *S. aureofaciens* ATCC No. 13,192 are used to inoculate 100 milliliters of a sterile medium prepared according to the following formulation:

| Ingredients: | Amount, grams |
|---|---|
| Sucrose | 30 |
| Ammonium sulfate | 2 |
| Calcium carbonate | 7 |
| Corn steep liquor | 20 |
| Tap water q.s., 1000 milliliters. | |

After incubation at 26.5° C. for 24 hours, 1 milliliter portions of this inoculum are used to seed 25 milliliters of a sterile medium prepared according to the following formulation:

| Ingredients: | Amount, grams |
|---|---|
| Ammonium sulfate | 5 |
| Calcium carbonate | 9 |
| Ammonium chloride | 1.5 |
| Magnesium chloride.6H$_2$O | 2 |
| Ferrous sulfate.7H$_2$O | 12 |
| Manganese sulfate.4H$_2$O | 10 |
| Cobalt chloride.6H$_2$O | 1 |
| Zinc sulfate.7H$_2$O | 20 |
| Corn steep liquor | 25–30 |
| Starch | 55 |
| Water q.s., 1000 milliliters. | |

This inoculated medium is incubated at 25° C. on a rotary shaker for 48 hours.

Three milliliter portions of the mash are transferred to 20 x 150 mm. sterile shaker tubes containing 1.5 milligrams of 4-dedimethylamino-6-demethyl-12a-deoxy-7-chloroanhydrotetracycline (prepared synthetically as described by Boothe et al., J.A.C.S. 81, 1006 (1959). The tubes are mounted on a reciprocating shaker and allowed to incubate for an additional 72 hours at 25° C. The tubes are then removed, the mash in each diluted with 10 milliliters of 0.1 N hydrochloric acid and the mycelium removed by filtration. The filtrate is extracted by shaking with 0.5 milliliter of o-chlorophenol. Five microliters of the phenol phase are spotted on a sheet of Whatman No. 1 chromatographic paper which has been prepared by first dipping in pH 6.0 McIlvaine buffer and dried and then dipped in formamide-acetone (30:70) and dried for 15 minutes. The spotted chromatogram is developed with the upper phase of the following system:

| | |
|---|---|
| Butyl acetate | 20 |
| Formamide | 1 |
| Water | 1 |

The conversion of 4-dedimethylamino-6-demethyl-12a-deoxy-7-chloroanhydrotetracycline to 4-dedimethylamino-6-demethyl-12a-deoxy-7-chlorotetracycline is shown by the presence of a spot at R$_f$ 0.20, identical to reference material.

To a 50 ml. Erlenmeyer flask is added 2.0 ml. of pH 4.4 McIlvaine buffer, 2.5 ml. of a 1 mg./ml. methanolic solution of 4-dedimethylamino-6-demethyl-12a-deoxy-7-chlorotetracycline (also available as described by Webb et al., J.A.C.S. 79, 4563 (1957)) and 0.5 ml. of a 4 mg./ml. aqueous solution of sodium nitrite. A control flask contains an additional 0.5 ml. buffer in place of the sodium nitrite solution. The flasks were agitated on a reciprocating shaker and samples taken at intervals to follow the course of 12a-hydroxylation. The production of 4-dedimethylamino-6-demethyl-7-chlorotetracycline is supported on the basis of spectrophotometric and paper chromatographic assays as well as by the enhanced antibacterial activity of reaction mixture aliquots with time. Some 1 ml. aliquots were removed and added to 4 ml. N/10 HCl for antibacterial assay and paper chromatography. Microbiological assay against *Staphylococcus aureus* showed the following:

| Time, hrs. | Mg./ml. as 4-dedimethylamino-6-demethyl-7-chlorotetracycline | |
|---|---|---|
| | Sample + NaNO$_2$ | Control |
| 0 | 65 | 87.5 |
| 2 | 231 | 122.0 |

Paper chromatography on the system, described previously in this example, revealed the presence of 4-dedimethylamino-6-demethyl-7-chlorotetracycline. Spectrophotometric assay was carried out as described in the preceding example and the following data were obtained:

| Time, Hrs. | Optical Density at 465 mμ in M/10 Borate | |
|---|---|---|
| | Sample + NaNO$_2$ | Control |
| 0 | 0.725 | 0.760 |
| 2 | 0.452 | 0.862 |

This application is a continuation-in-part of our copending application Serial No. 719,190, filed March 5, 1960, now abandoned.

What is claimed is:

1. The process for the 12a-hydroxylation of 12a-deoxytetracyclines which comprises contacting a 12a-deoxytetracycline with an inorganic oxidizing agent at a temperature of from about 0° C. to about 50° C. and at a pH of from about 2 to about 7, said inorganic oxidizing agent being present in the reaction mixture in amounts ranging from about one-eighth to about twice the molar concentration of the 12a-deoxytetracycline.

2. The process according to claim 1 in which the inorganic oxidizing agent is selected from the group consisting of sodium nitrite, potassium nitrite, potassium permanganate, potassium dichromate, potassium ferricyanide, iodine and potassium persulfate.

3. The process according to claim 1 in which the 12a-deoxytetracycline is selected from the group consisting of 12a-deoxytetracycline, 6,12a-dideoxytetracycline, 6-demethyl-12a-deoxytetracycline, 6-demethyl-12a-deoxy-7-chlorotetracycline, 4-dedimethylamino-12a-deoxytetracycline, 4-dedimethylamino-6-demethyl-6,12a-dideoxytetracycline and 4-dedimethylamino-6-demethyl-12a-deoxy-7-chlorotetracycline.

No references cited.